(12) United States Patent
Dehghan et al.

(10) Patent No.: US 12,726,536 B2
(45) Date of Patent: Sep. 1, 2026

(54) DISTRIBUTED MODEL-FREE COMPUTE OFFLOADING WITH LATENT LAYER INTELLIGENCE

(71) Applicant: Dell Products L.P., Round Rock, TX (US)

(72) Inventors: Hoda Dehghan, Kanata (CA); Gwenael Poitau, Montreal (CA)

(73) Assignee: Dell Products L.P., Round Rock, TX (US)

( * ) Notice: Subject to any disclaimer, the term of this patent is extended or adjusted under 35 U.S.C. 154(b) by 64 days.

(21) Appl. No.: 18/919,945

(22) Filed: Oct. 18, 2024

(65) Prior Publication Data

US 2026/0113373 A1 Apr. 23, 2026

(51) Int. Cl.
*H04L 41/142* (2022.01)
*H04L 67/1008* (2022.01)

(52) U.S. Cl.
CPC ........ *H04L 67/1008* (2013.01); *H04L 41/142* (2013.01)

(58) Field of Classification Search
CPC .......................... H04L 67/1008; H04L 41/142
See application file for complete search history.

(56) References Cited

U.S. PATENT DOCUMENTS

2018/0183855 A1* 6/2018 Sabella .................. H04L 67/04
2020/0142735 A1* 5/2020 Maciocco ............ H04L 9/0894
2020/0169602 A1* 5/2020 Aronovich ............. H04L 67/10
2020/0267053 A1* 8/2020 Zheng ..................... H04L 47/31
2021/0117242 A1* 4/2021 Van De Groenendaal ................. H04L 67/51
2022/0014963 A1* 1/2022 Yeh ................... H04W 28/0268
2022/0124543 A1* 4/2022 Orhan ................ H04W 28/021
2024/0333739 A1* 10/2024 Agrawal ............ H04L 63/1425
2024/0367678 A1* 11/2024 Faruque ............. B60W 60/001
2025/0280050 A1* 9/2025 Wang .................... H04L 67/101
2026/0104878 A1* 4/2026 Curic ........................ G06F 8/65

OTHER PUBLICATIONS

Q. Li, S. Wang, A. Zhou, X. Ma, F. Yang and A. X. Liu, "QoS Driven Task Offloading With Statistical Guarantee in Mobile Edge Computing," in IEEE Transactions on Mobile Computing, vol. 21, No. 1, pp. 278-290, Jan. 1, 2022.

H. A. Alameddine, S. Sharafeddine, S. Sebbah, S. Ayoubi and C. Assi, "Dynamic Task Offloading and Scheduling for Low-Latency IoT Services in Multi-Access Edge Computing," in IEEE Journal on Selected Areas in Communications, vol. 37, No. 3, pp. 668-682, Mar. 2019.

(Continued)

*Primary Examiner* — Aftab N. Khan
(74) *Attorney, Agent, or Firm* — Workman Nydegger

(57) ABSTRACT

One example method includes collecting real time data regarding operations in a network, processing the real time data to create structured data, extracting latent features from the structured data, using the latent features to generate potential workload offloading scenarios, identifying an optimal workload offloading scenario from the potential workload offloading scenarios, translating the optimal workload offloading scenario into a form understandable by a network device that is performing a workload, and transmitting an offloading command to the network device.

20 Claims, 3 Drawing Sheets

(56) References Cited

OTHER PUBLICATIONS

J. Cotter, I. Castiñeiras, D. O'Shea, and V. Cionca. "A comparative analysis of proactive and reactive methods for privacy-aware interleaved DNN offloading." Computer Networks 236, 2023.
H. Gao, X. Wang, W. Wei, A. Al-Dulaimi and Y. Xu, "Com-DDPG: Task Offloading Based on Multiagent Reinforcement Learning for Information-Communication-Enhanced Mobile Edge Computing in the Internet of Vehicles," in IEEE Transactions on Vehicular Technology, vol. 73, No. 1, pp. 348-361, Jan. 2024.
W. Fan, Z. Chen, Z. Hao, F. Wu and Y. Liu, "Joint Task Offloading and Resource Allocation for Quality-Aware Edge-Assisted Machine Learning Task Inference," in IEEE Transactions on Vehicular Technology, vol. 72, No. 5, pp. 6739-6752, May 2023.

* cited by examiner

DISTRIBUTED MODEL-FREE COMPUTE OFFLOADING WITH LATENT LAYER INTELLIGENCE

TECHNOLOGICAL FIELD OF THE DISCLOSURE

Embodiments disclosed herein generally relate to workload placement in a distributed network. More particularly, at least some embodiments relate to systems, hardware, software, computer-readable media, and methods, for distributed model-free compute offloading, using latent layer intelligence.

BACKGROUND

In the rapidly evolving landscape of network resource management, traditional compute offloading methods, that is, methods for compute workload placement, have struggled to keep pace with the dynamic nature of network conditions and the varying capabilities of devices in the network. These conventional methods typically rely on static, predefined models and methods that lack the flexibility to adapt to real-time changes in the network, leading to suboptimal resource allocation, increased latency, and inefficient utilization of computational resources. Thus, a current challenge lies in developing a system that not only understands and reacts to the current state of the network and its devices but also anticipates and adapts to changes in real-time, ensuring optimal task distribution and resource utilization across a network of interconnected devices.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings.

DETAILED DESCRIPTION OF SOME EXAMPLE EMBODIMENTS

Figure 1:
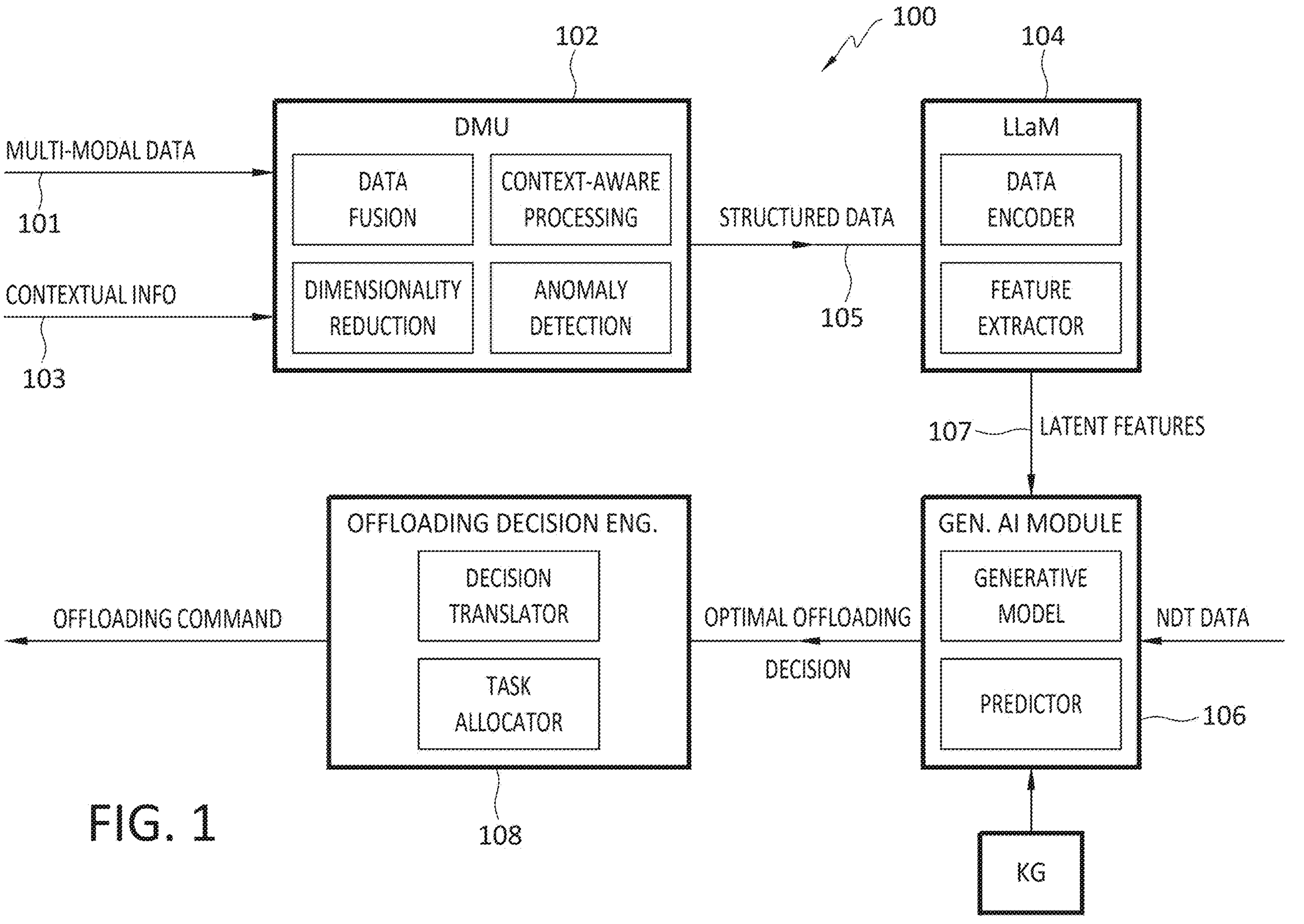
FIG. 1 discloses aspects of an architecture according to one embodiment.

Embodiments disclosed herein generally relate to workload placement in a distributed network. More particularly, at least some embodiments relate to systems, hardware, software, computer-readable media, and methods, for distributed model-free compute offloading, using latent layer intelligence.

It is noted that while reference herein is made to offloading of workloads, such as compute workloads for example, the scope of this disclosure is not limited to offloading of workloads, but also extends to the assignment of workloads newly identified and/or tasked for performance in a network. Thus, in one embodiment, an assigned, or running, workload, may be reassigned to another network component, and a workload tasked to a network component, but not yet running, may be reassigned to another network component. Offloading of a workload is not limited to movement of a running workload.

One or more embodiments are concerned with a system, method, and architecture, that operate to orchestrate workloads in a distributed network. An embodiment may make, in real time, workload assignments to network devices based on ongoing real-time changes in the network, and/or based on anticipated, but not yet realized, changes in the network. Such changes may comprise, for example, the addition and/or removal of network devices, changes in available, bandwidth in the network, problems or faults in the network, and changes to the capabilities of one or more of the devices in the network.

An architecture according to one embodiment may comprise a sensing layer that captures real-time data related to network device workloads, energy levels, and network conditions, for example. The sensing layer may pass this data to a latent layer model (LLaM) which may process the data to identify latent features that may be used to inform workload assignments in the network. The latent features may be passed to a generative AI (artificial intelligence) model, which may create predictive adaptive workload offloading decisions, and then select the best of the predicted decisions. The selected predicted decision may then be passed to an offloading decision engine which may convert decisions received from the generative AI module into actionable offloading commands. The offloading decision engine may then issue the commands to effect one or more workload assignments in the network.

Embodiments, such as the examples disclosed herein, may be beneficial in a variety of respects. For example, and as will be apparent from the present disclosure, one or more embodiments may provide one or more advantageous and unexpected effects, in any combination, some examples of which are set forth below. It should be noted that such effects are neither intended, nor should be construed, to limit the scope of the claims in any way. It should further be noted that nothing herein should be construed as constituting an essential or indispensable element of any embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments is that workload assignments in a network may be made based on real time, and/or predicted, events and conditions occurring, or anticipated to occur, in the network. In an embodiment, workload offloading may be performed in real time based on changing network conditions. Various other advantages of one or more embodiments will be apparent from this disclosure.

A. Context for an Embodiment

The following is a discussion of aspects of example context for various embodiments. This discussion is not intended to limit the scope of the claims or this disclosure, or the applicability of the embodiments, in any way. Reference is made herein to the following documents, which are incorporated herein in their respective entireties by this reference.

[1] Q. Li, S. Wang, A. Zhou, X. Ma, F. Yang and A. X. Liu, "*QoS Driven Task Offloading With Statistical Guarantee in Mobile Edge Computing," in IEEE Transactions on Mobile Computing*, vol. 21, no. 1, pp. 278-290, 1 Jan. 2022.

[2] H. A. Alameddine, S. Sharafeddine, S. Sebbah, S. Ayoubi and C. Assi, "*Dynamic Task Offloading and Scheduling for Low-Latency IoT Services in Multi-Access Edge Computing," in IEEE Journal on Selected Areas in Communications*, vol. 37, no. 3, pp. 668-682, March 2019.

[3] J. Cotter, I. Castiñeiras, D. O'Shea, and V. Cionca. "*A comparative analysis of proactive and reactive methods for privacy-aware interleaved DNN offloading*." Computer Networks 236, 2023.

[4] H. Gao, X. Wang, W. Wei, A. Al-Dulaimi and Y. Xu, "*Com-DDPG: Task Offloading Based on Multiagent Reinforcement Learning for Information-Communication-Enhanced Mobile Edge Computing in the Internet of Vehicles," in IEEE Transactions on Vehicular Technology*, vol. 73, no. 1, pp. 348-361, January 2024.

[5] W. Fan, Z. Chen, Z. Hao, F. Wu and Y. Liu, "*Joint Task Offloading and Resource Allocation for Quality-Aware Edge-Assisted Machine Learning Task Inference," in IEEE Transactions on Vehicular Technology*, vol. 72, no. 5, pp. 6739-6752 May 2023.

Historically, the domain of network resource management and computational task distribution has predominantly relied on static, model-based approaches. These conventional systems, often characterized by their reliance on predefined models, have been foundational in establishing the initial frameworks for compute offloading. However, they come with inherent limitations, primarily due to their inability to adapt dynamically to the ever-changing landscape of network conditions and device capabilities.

Conventional offloading systems typically operate based on static models that are predefined and lack the capability to adapt to real-time changes in the network [1]. These models, while useful in stable and predictable environments, struggle to maintain efficiency and effectiveness in dynamic scenarios where network conditions and device capabilities are constantly in flux.

Further, typical offloading approaches often face challenges in scaling and flexibly adapting to new types of devices and network architectures [2]. With the advent of IoT and edge computing, the variety and volume of devices have exploded, making it increasingly difficult for these traditional systems to provide optimal solutions that cater to the diverse needs and capabilities of each device.

Many existing technologies primarily focus on reacting to changes rather than anticipating and preparing for them. This reactive nature results in delays and inefficiencies, as the system must first encounter a change or a bottleneck before it can initiate an appropriate response [3].

As well, many of the conventional AI-driven offloading strategies depend heavily on historical data and require extensive training periods. While this can be effective to a certain extent, it also means that the system's ability to adapt to new or unforeseen conditions is limited by the data it has been trained on and its capacity to learn from new data in real-time [4], [5].

Further, conventional approaches often do not fully optimize resource utilization, leading to scenarios where some devices are overburdened while others are underutilized. This imbalance can result in problems such as increased latency, decreased battery life of devices, and overall sub-optimal performance of the network [5].

By way of contrast with the conventional approaches noted above, a system, method, and architecture, according to one embodiment, are configured to address these challenges by introducing dynamic adaptation mechanisms and leveraging the power of LLaMs and Generative AI. This approach marks a significant departure from traditional methods, in that this approach comprises not simply incremental improvements over conventional approaches, but comprises a comprehensive remodeling of computational resource allocation and utilization.

B. Overview of Aspects of One Embodiment

B.1 Introduction

This disclosure provides, among other things, an approach to network resource management and computational task distribution. In one embodiment, a system employs a dynamic adaptation mechanism facilitated by the interplay of four components, namely, a Sensing Layer, a Latent Layer Model (LLaM), a Generative AI Module, and an Offloading Decision Engine.

The Sensing Layer, acting as a Data Management Unit (DMU), captures and processes real-time data from a network of interconnected devices, analyzing device workloads, energy levels, and network conditions. This data is then distilled by the LLaM into latent features, offering a nuanced understanding of the network's current state and device capabilities. These features serve as the foundation for the Generative AI Module, which generates and evaluates multiple offloading scenarios, considering factors like latency, energy consumption, and device workload. The selected offloading decision, deemed most optimal for the current network conditions, is then translated into actionable commands by the Offloading Decision Engine, ensuring efficient task distribution and resource allocation in real-time.

This architecture thus comprises a significant departure from traditional compute offloading methods, at least insofar as it comprises a model-free approach, eliminating reliance on extensive training or historical data, which is particularly advantageous in environments such as edge computing, where network conditions and device capabilities can rapidly change. The ability of the system to dynamically adapt, powered by the integration of LLaMs and Generative AI, ensures that decisions are optimal and responsive to the evolving network environment. This not only enhances network efficiency, but may also reduce operational costs.

B.2 Brief Discussion of an Example Embodiment

An architecture according to one embodiment, which may be referred to herein as "Distributed Model-Free Compute Offloading with Latent Layer Intelligence," may be configured and operate to optimize computational task distribution among a network of interconnected devices. FIG. 1 discloses an example architecture 100, also referred to herein as a "Distributed Model-Free Compute Offloading Framework," according to one embodiment. Following is an overview of the components of the architecture 100, with a more detailed description later.

The architecture 100 is configured to implement a principle of dynamic adaptation, which may be realized through the interplay of its four components, namely, a Sensing Layer 102, a Latent Layer Model (LLaM) 104, a Generative AI Module 106, and an Offloading Decision Engine 108. In an embodiment, the Sensing Layer 102 initiates the process by continuously collecting multi-modal data 101 and contextual information 103, such as, for example, real-time data on device workloads, energy levels, and network conditions, through its network interface and data preprocessor. In an embodiment, this data forms the foundational layer upon which the intelligent decision-making of the architecture 100 is built.

It is at the LLaM 104 where the high-dimensional, complex, structured data 105 gathered by the sensing layer 102 is transformed into a lower-dimensional, more manageable latent space. The LLaM 104 not only simplifies the data but also extracts latent features 107 from the structured data 105 that are most indicative of the current state and capabilities of the network and its constituent devices. The LLaM 104 also helps to reduce the number of tokens, and associated energy and cost, required for the Generative AI Module 106 inferencing process. These elements enable the making of informed offloading decisions, ensuring that the system understanding of the network environment is both comprehensive and nuanced.

Next, the Generative AI Module 106 takes the latent features 107 identified by the LLaM 104 and uses them to generate a range of potential offloading scenarios. It is noted that the Generative AI Module 106 does not only create offloading options, but the Generative AI Module 106 also evaluates those options in real-time, for example, by leveraging a network digital twin to perform the evaluations, considering factors such as, but not limited to, latency, energy consumption, and device availability, ensuring that the chosen offloading decision is not simply feasible, but optimal, given the current and/or anticipated network conditions.

Finally, the Offloading Decision Engine 108 operates to translate the Generative AI Module 106*s* output into actionable offloading commands. This the Offloading Decision Engine 108 may help to ensure that the theoretical decisions made by the Generative AI Module 106 have practical, real-world applications. The Offloading Decision Engine 108 determines which computational tasks should be offloaded to which devices, considering the collective goal of the network to maximize efficiency and reduce latency. This is where the decisions generated by the architecture 100 are actualized.

The continuous monitoring and adaptation element of the architecture 100 may help to ensure that the architecture, and computational task assignments, are not static, or one-time solutions, but rather are dynamic, where the architecture 100 is an evolving entity that responds in real-time to changes in the network environment. This is one area where the architecture 100 and its operations differentiate from conventional compute offloading methods, which rely on predefined models that may not adapt well to the dynamic nature of network conditions and device capabilities.

Further, the use of LLaMs 104 and Generative AI modules 106 lends the architecture 100 a high level of flexibility and adaptability. The LLaMs 104 may simplify complex data, enabling quicker and more efficient computation and decision-making, while the ability of the Generative AI module 106 to generate and evaluate multiple offloading scenarios in real-time ensures that the decisions generated by the architecture 100 are always optimal based on the current state of the network and devices.

In an embodiment, the architecture 100 does not simply reacts to changes in the network but also anticipates changes, so as to ensure that the architecture 100 is always looking forward. This anticipatory capability is embedded within the architecture 100, for example, through the intelligent interplay between the LLaM 104 and the Generative AI Module 106. By continuously analyzing real-time data collected by the Sensing Layer 102, the architecture 100 may predict future network conditions and device requirements. This foresight enables the architecture 100 to proactively adjust computational task distribution, optimizing network efficiency and responsiveness before potential challenges or inefficiencies arise. The ability of the architecture 100 to anticipate, rather than only react, ensures that the architecture 100 remains adaptive and efficient, even in the most dynamic and unpredictable network environments. This forward-looking approach not only enhances the performance of the architecture 100 but also ensures the architecture 100 is a step ahead in resource management and decision-making.

Furthermore, while the model-free configuration of the architecture 100 implies it is not dependent on extensive training or historical data for accurate predictions, it is noted that, in one embodiment, a substantial amount of data may still be needed to train the GenAI module 106. In an embodiment, one notable advantage is the enhanced generalization capabilities of the GenAI module 106, especially in zero-shot scenarios, which surpass those of classical discriminative AI models. This distinction may be important in edge computing environments, where the variability of devices and the rapid changes in network conditions present unique challenges. By leveraging the processed data from the Latent Layer Model (LLaM) 104, the architecture 100 may adapt dynamically to changes in the state of the network. This approach, based at least in part on the advanced generalization ability of the GenAI module 106, comprises a notable improvement and evolution in distributed computing, enabling more flexible and efficient adaptation to ever-changing network environments.

Embodiments disclosed herein may be employed in a wide variety of applications and environments. Following are some non-limiting examples. In edge computing, for example, an embodiment may optimize task distribution to effectively leverage edge devices. As another example, in mobile networks, an embodiment may manage the offloading of computational tasks to avoid congestion and improve battery life. In cloud computing, as another example, an embodiment may balance a workload load across servers in real-time, maximizing efficiency and reducing operational costs. Thus, an embodiment, which may comprise an architecture such as the architecture 100, and/or a workflow, may operate to optimize resource allocation dynamically and efficiently across a network of connected devices. Following is a discussion, with reference to the example of FIG. 1, of how, in one embodiment, the components interact in a workflow that supports model-free compute offloading.

B.3 Example Components and Workflow of One Embodiment

B.3.1a System Architecture

- I. Sensing Layer 102:
  - Function: Captures real-time data related to device workloads, energy levels, and network conditions.
  - Components:
    - Network Interface: Facilitates data collection from various devices.
    - Data Preprocessor: Cleans and normalizes the incoming data for further processing.

II. Latent Layer Model (LLaM) 104:

Function: Processes the sensed data to identify latent features crucial for making informed offloading decisions.

Components:

Data Encoder: Transforms high-dimensional data into a lower-dimensional latent space.

Feature Extractor: Identifies and isolates significant features from the latent space that influence offloading decisions.

III. Generative AI Module 106:

Function: Utilizes the latent features to generate predictive, adaptive offloading decisions.

Components:

Generative Model: Creates potential offloading scenarios based on current data.

Predictor: Selects the most efficient offloading decision from the generated scenarios.

IV. Offloading Decision Engine 108:

Function: Converts the decisions from the generative AI module 106 into actionable offloading commands.

Components:

Decision Translator: Specialized LLM (Large Language Model)-based module translates AI decisions into specific offloading tasks.

Task Allocator: Assigns computational tasks to devices based on the decisions, considering overall network efficiency and device capabilities.

B.3.1b Workflow

I. Data Collection:

The sensing layer 102 continuously gathers real-time data about device workloads, energy levels, and network conditions.

II. Data Processing and Feature Extraction:

The collected data is processed and encoded by the LLaM 104, which then extracts relevant latent features that are indicative of the current state and capabilities of the network and devices.

III. Generative Prediction & Decision Making:

The generative AI module 106 receives the latent features and generates a range of potential offloading decisions.

The generative AI module 106 evaluates these scenarios based on current network conditions, device status, and predefined efficiency metrics such as, but not limited to, latency, and energy consumption.

The most optimal offloading decision is selected by the generative AI module 106.

IV. Decision Implementation:

The offloading decision engine 108 receives the chosen offloading strategy.

The offloading decision engine 108 translates this strategy into specific offloading commands and allocates tasks to devices accordingly, shifting one or more workloads from one or more overloaded devices to one or more underutilized devices, in real-time.

V. Continuous Monitoring and Adaptation:

The system, comprising the architecture 100, continuously monitors the network for any changes in device status or computational demands.

The LLaM 104 and generative AI module 106 adapt to these changes by processing new data and updating the offloading decisions, ensuring the system remains efficient and responsive to the dynamic network environment.

B.4 Aspects of an Embodiment of Model-Free Compute Offloading

An embodiment of a model-free compute offloading process may comprise various useful aspects, although no embodiment is require to possess any of such aspects. The following examples are illustrative, but not exhaustive.

One such aspect is dynamic adaptation, in which the use of LLaMs and Generative AI enables an embodiment of the system to adapt in real-time to changing network conditions and device capabilities, without relying on static, predefined models. Another example aspect of an embodiment is latent feature utilization, in which an embodiment of the system leverages latent features, which encode complex, high-dimensional data into a simplified form, enabling quicker and more efficient computation and decision-making. A final example of an aspect of an embodiment is generative flexibility, in which a generative AI module may generate and evaluate multiple offloading scenarios in real-time, ensuring that the system's decisions are always optimal based on the current state of the network and devices. As these non-limiting examples illustrate, an architecture and workflow, according to one embodiment, collectively enable a robust, adaptive, and efficient system for model-free compute offloading, suitable for dynamic and heterogeneous network environments like edge computing, mobile networks, and cloud infrastructures. Further details concerning various aspects of one or more embodiments are discussed below.

As noted above, one aspect of one or more embodiments is dynamic adaptation, that is, dynamic adaptation through generative AI and LLaM modeling. In more detail, a system according to one embodiment departs from conventional static and predefined models by integrating LLaMs with a generative AI module. LLAMs distill high-dimensional data into a lower-dimensional, more manageable latent space, highlighting latent features that significantly impact offloading decisions. The generative AI module takes these features and generates multiple offloading scenarios, simulating different configurations of task distribution across the network's devices. Thus, an embodiment of a generative AI module may not only generate a variety of scenarios, but the generative AI module may have the ability to evaluate these scenarios in real-time, considering factors such as, but not limited to, latency, energy consumption, device workload, and availability. This ensures that the chosen offloading decision is optimal for the then-current network conditions.

Such an approach thus constitutes a shift from static, one-size-fits-all solutions to a dynamic, adaptive framework. This approach enables the system to anticipate changes and adapt in real-time, ensuring optimal resource allocation and task distribution in response to evolving network conditions and device capabilities. This dynamic adaptation capability may be particularly beneficial in edge computing environments and other scenarios where device variability and network conditions can change rapidly.

Another aspect of an embodiment, noted above, concerns the interaction between a generative AI model, and an offloading decision engine. In particular, in one embodiment, the offloading decision engine translates the theoretical decisions made by the generative AI module into actionable, real-world offloading commands. In one embodiment, the offloading decision engine comprises two parts, namely, a decision translator, and a task allocator. The LLM-based decision translator interprets the offloading decisions of the generative AI module into specific commands that the network devices can understand, and act upon. The task allocator then assigns and schedules these offloading tasks to the appropriate devices, considering factors such as, but not limited to, device capacity, current workload, energy efficiency, and overall network efficiency. In an embodiment then, the system bridges the gap between high-level AI decision-making and practical, on-ground execution. This ensures that the theoretical decisions generated by the generative AI module do not simply remain in the realm of possibilities but are translated into tangible actions that lead to real, measurable, improvements in areas such as, but not limited to, network efficiency, reduced latency, and balanced device workloads. The ability to implement AI-driven decisions in real-time significantly enhances the responsiveness and operational efficiency of the system.

C. Detailed Discussion of Aspects of an Embodiment

In this section, each of the system architecture 100 components are addressed in detail. The discussion addresses, for example, the inputs and outputs, required interfaces, deployed algorithms for each component, their deployment location, and their interactions with each other. Reference may be made again to the example architecture 100, and workflow, disclosed in FIG. 1.

C.1 Sensing Layer, According to One Embodiment

The sensing layer, an example of which is referenced at 102 in FIG. 1, when conceptualized as a Data Management Unit (DMU) in a multi-modal context within an Open RAN (O-RAN) environment, is tasked with a more complex and comprehensive role. This role involves gathering, processing, and managing a wide range of data types from various sources across the network. The function of a DMU, as an element of one embodiment, has evolved to encompass a much broader spectrum of data types, transcending the conventional capturing of basic metrics. In an embodiment, a DMU now has the capacity to handle a diverse range of data formats, including audio, video, sensor data, and user interactions. This transformation enables the system to operate effectively in a multi-modal data environment, where different data sources and formats are integrated seamlessly. To support this enhanced function, several components are provided in a system architecture according to one embodiment and include, but are not limited to:

1. Enhanced Network Interface: This component serves as an interface that facilitates the collection of a more extensive array of data types from various sources. It extends its reach to IoT devices, user equipment, and edge nodes, ensuring that data can be aggregated from a multitude of origins. By broadening the scope of data collection, this component lays the foundation for the ability of an embodiment of the system to process and analyze diverse data streams effectively.
2. Advanced Data Preprocessor: An embodiment of the advanced data preprocessor incorporates algorithms tailored to handle the intricacies and variability of multi-modal data. This advanced preprocessing capability is useful for preparing the incoming data for subsequent analysis and interpretation, ensuring that the system can effectively extract meaningful insights from the diverse data it receives.

Example inputs and outputs, O-RAN interfaces, and deployed algorithms for sensing layer, according to one embodiment, described below.

1. Inputs and Outputs:
   - Inputs
     1. Multi-Modal Data: Includes not just network metrics but also user behavior data, multimedia content, sensor readings, and environmental data.
        - Device-Specific Data: Information about device workloads, processing power, storage capacity, battery levels, and operational status.
        - Network-Specific Data: Metrics such as bandwidth usage, latency, throughput, error rates, and signal strength.
     2. Contextual Information: Including location data, time stamps, and device-specific information.
        - Environmental Data: Information about the physical and operational environment of devices, which could include temperature, humidity, or even data about the physical location and mobility patterns of devices.
        - User Behavior Data: Insights into how users interact with their devices, which can include usage patterns, app activity, and service demands.
   - Outputs
     1. Structured Multi-Modal Data: May include aggregated, cleaned, and normalized data, ready for further analysis and decision-making processes. The outputs from the DMU are multi-dimensional datasets that represent the state of the network and devices in a comprehensive manner. The data is not only cleaned and normalized but is also synchronized across different modalities to ensure consistency in time-series analysis or when feeding into subsequent AI/ML models.

II. O-RAN Interfaces:
   - In addition to the O1, O2, and A1 interfaces, a multi-modal sensing layer may, in one embodiment, comprise:
     - E2 Interface: For real-time control and data collection from the RAN, crucial for dynamic network adaptation; and
     - Non-RT RIC: Interfaces with the Non-Real-Time (RT) RAN Intelligent Controller (RIC) for broader network insights and policies.

III. Sample Algorithms to Process Multi-Modal Data:
   - Data Fusion Algorithms: To integrate data from various modalities into a unified format, ensuring that the merged data makes sense and provides a holistic view of the network state.
   - Context-Aware Processing: Algorithms that consider the context (like location or time) in which the data was collected.
   - Anomaly Detection: Identifying outliers or unusual patterns in the multi-modal data set.
   - Dimensionality Reduction Techniques: To distill large volumes of data into more manageable forms without losing critical information.

IV. Additional Considerations:
   - Security and Privacy: Implementing robust encryption and anonymization techniques, especially crucial when handling sensitive user data.
   - Scalability and Flexibility: Ensuring the system can handle the increasing volume and variety of data as the network grows.
   - Real-Time Processing Capability: Given the diversity and volume of data, the system may be capable of processing information in real-time or near-real-time.

Thus, when an embodiment of a sensing layer is conceptualized as a DMU in a multi-modal setup within an Open RAN architecture, the functionalities of the sensing layer extend beyond mere data capture and preprocessing. That is, the sensing layer comprises a unit that ensures the integrity, consistency, and security of multi-dimensional data, paving the way for intelligent, data-driven decision-making across the network. The DMU role enables the harnessing of the full potential of a dynamic and responsive Open RAN ecosystem.

C.2 Latent Layer Model (LLaM), According to One Embodiment

In an embodiment, the Latent Layer Model (LLaM) serves as a data-processing unit within the system, primarily functioning to distill high-dimensional data into actionable insights. This component operates to extract the essence of the raw data collected by the sensing layer, or DMU, and transforms that data into a form that the generative AI module can effectively utilize.

The LLaM processes and interprets multi-modal data, extracting and identifying latent features that may not immediately be apparent but which may be important for making informed decisions, particularly for compute offloading in an Open RAN environment. In one embodiment, the components of the LLaM unit, their input-outputs, their locations, and potential deployed algorithms may comprise the following:

- I. Components and Their Roles:
  - Data Encoder:
    - Function: Compresses high-dimensional input data into a lower-dimensional latent space, making the data more manageable and highlighting inherent patterns or features.
    - Location: Typically, but not necessarily, located at a centralized node or in the cloud to leverage computational resources for complex encoding tasks.
  - Feature Extractor:
    - Function: Analyzes the encoded data to isolate significant features that are most influential in informing offloading decisions, thereby facilitating a more nuanced understanding of the network's current state.
    - Location: Can be co-located with the data encoder for efficiency, especially if immediate subsequent processing is required.
- II. Inputs and Outputs:
  - Inputs:
    - Structured multi-modal data from the sensing layer, encompassing network metrics, device statuses, and other relevant information.
  - Outputs:
    - A set of latent features representing the distilled essence of the input data, ready to be utilized by the generative AI module for decision-making.
- III. Deployed Algorithms and Their Interactions:
  - LLaM employs a variety of algorithms, each serving a specific purpose in the data processing pipeline, where such algorithms may comprise:
  - Dimensionality Reduction Algorithms (for data encoder):
    - Techniques such as, but not limited to, PCA (Principal Component Analysis), autoencoders, or t-SNE (t-Distributed Stochastic Neighbor Embedding) to reduce the dimensionality of the data while preserving its intrinsic structure.
  - Feature Extraction Algorithms (for Feature Extractor):
    - Methods such as, but not limited to, deep learning models (CNNs for image data, RNNs for sequential data) or clustering algorithms to identify and isolate significant features from the latent space.
- IV. Interaction with Other Units:
  - LLaM receives preprocessed data from the Sensing Layer and provides the extracted features to the Generative AI Module.
  - Close coordination with the DMU ensures that the data fed into LLaM is clean, normalized, and representative of the real-time state of the network.
  - The output (latent features) directly influences the decisions made by the generative AI module.

In a wireless network, for example, the location of LLaM components is typically, but not necessarily, centralized due to the computational intensity of the tasks they perform. However, with advancements in edge computing, aspects of LLaM could potentially be distributed closer to the data sources to reduce latency and bandwidth usage, especially for initial data encoding processes.

Thus, an embodiment of an LLaM acts as a bridge between raw data collection and intelligent decision-making. By effectively distilling complex data into meaningful insights, the LLaM plays a role in ensuring that the system decisions are both informed and contextually relevant, ultimately enhancing the efficiency and adaptability of compute offloading in the O-RAN environment.

C.3 Generative AI Module and Offloading Decision Engine, According to an Embodiment The generative AI Module is an element of the system decision-making process, leveraging the distilled insights provided by the LLaM to forecast, and determine, optimal work offloading decisions. In an embodiment, the generative AI Module uses the latent features to generate a range of potential offloading scenarios, then evaluates and selects the most efficient strategy based on the current network conditions and device capabilities.

In one embodiment, the components of a generative AI Module, their input-outputs, their locations, and potential deployed algorithms, may comprise the following:

- I. Components
  - Generative Model:
    - Function: Generates a variety of potential offloading scenarios by simulating different configurations of task distribution across the network devices.
    - Location: Typically, but not necessarily, centralized due to the computational resources and complex algorithms involved, although parts of the generative model may be distributed for localized decision-making.
  - Predictor:
    - Function: Evaluates the generated offloading scenarios against a set of performance metrics such as, but not limited to, latency, energy efficiency, and device workload, to select the most optimal offloading decision.
    - Location: May be co-located with the generative model to efficiently process the generated offloading scenarios.
- II. Inputs and Outputs:
  - Inputs:
    - Latent features from the LLaM: representing the current state and capabilities of the network and its devices.
    - Network Digital Twin (NDT) Predictions/States: Per emulated scenarios, providing a dynamic and virtual representation of the network.

Knowledge Graph (KG): A structured representation of the network entities and their interrelations. It provides insights into device capabilities, historical performance metrics, and the relationships between different network nodes. The inclusion of a knowledge graph enriches the decision-making process by incorporating a comprehensive understanding of the network structure, behavior, and potential bottlenecks.

Outputs:

The most optimal offloading decision, ready to be implemented by the offloading decision engine.

III. Deployed Algorithms

Generative Algorithms:

Techniques such as, but not limited to, Generative Adversarial Networks (GANs), Variational Autoencoders (VAEs), LLMs and diffusion models to simulate and generate a wide array of potential offloading scenarios.

Predictive Algorithms:

Machine learning models, such as reinforcement learning or deep neural networks, to evaluate and select the most optimal offloading decision based on the generated scenarios.

In one embodiment, the ability of a generative AI module to create and evaluate multiple scenarios in real-time enables the system to adapt dynamically to changing network conditions. This functionality comprises a significant advancement over conventional static, predefined models.

The offloading decision engine is the actionable arm of the system, translating the decisions made by the generative AI module into practical offloading commands that can be executed within the network. The offloading decision engine translates the AI-driven offloading decisions into specific, actionable tasks, ensuring that computational workloads are efficiently distributed across the network devices based on current conditions and overall network objectives. In one embodiment, the components of the offloading decision engine, their input-outputs, their locations, and potential deployed algorithms may comprise the following:

I. Components:

Decision Translator:

Function: Specialized LLM-based decision translator converts the offloading decisions from the Generative AI Module into specific offloading commands understandable by the network devices.

Location: Typically, but not necessarily, centralized to maintain a holistic view of the network, although certain aspects might be distributed for quicker response times.

Task Allocator:

Function: Assigns and schedules the offloading tasks to the appropriate devices, considering factors like device capacity, current workload, and energy efficiency.

Location: Can be partly distributed to edge nodes for faster execution and reduced latency.

II. Inputs and Outputs:

Inputs:

The optimal offloading decision from the generative AI module.

Outputs:

Specific offloading commands sent to various devices across the network.

III. Open RAN Interfaces:

In one embodiment, the offloading decision engine may interface with the Non-RT RIC and the E2 interface for policy enforcement, and real-time control, respectively.

C.4 Glossary of Some Terms

Following is a glossary of various terms used in this disclosure. The definitions set forth below are not intended to limit the scope of this disclosure, or any claims, in any way.

| Term | Definition |
|---|---|
| AI | Artificial Intelligence |
| CNN | Convolutive Neural Network |
| DMU | Dat management Unit |
| GAN | Generative Adversarial Networks |
| KG | Knowledge Graph |
| LLaM | Latent Layer Model |
| NDT | Network Digital Twin |
| O-RAN | Open Radio Access Network |
| PCA | Principal Component analysis |
| RNN | Recurrent Neural network |
| t-SNE | t-Distributed Stochastic Neighbor Embedding |
| VAE | Variational Autoencoder |

D. Example Methods

It is noted that any operation(s) of any of the methods disclosed herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Figure 2:
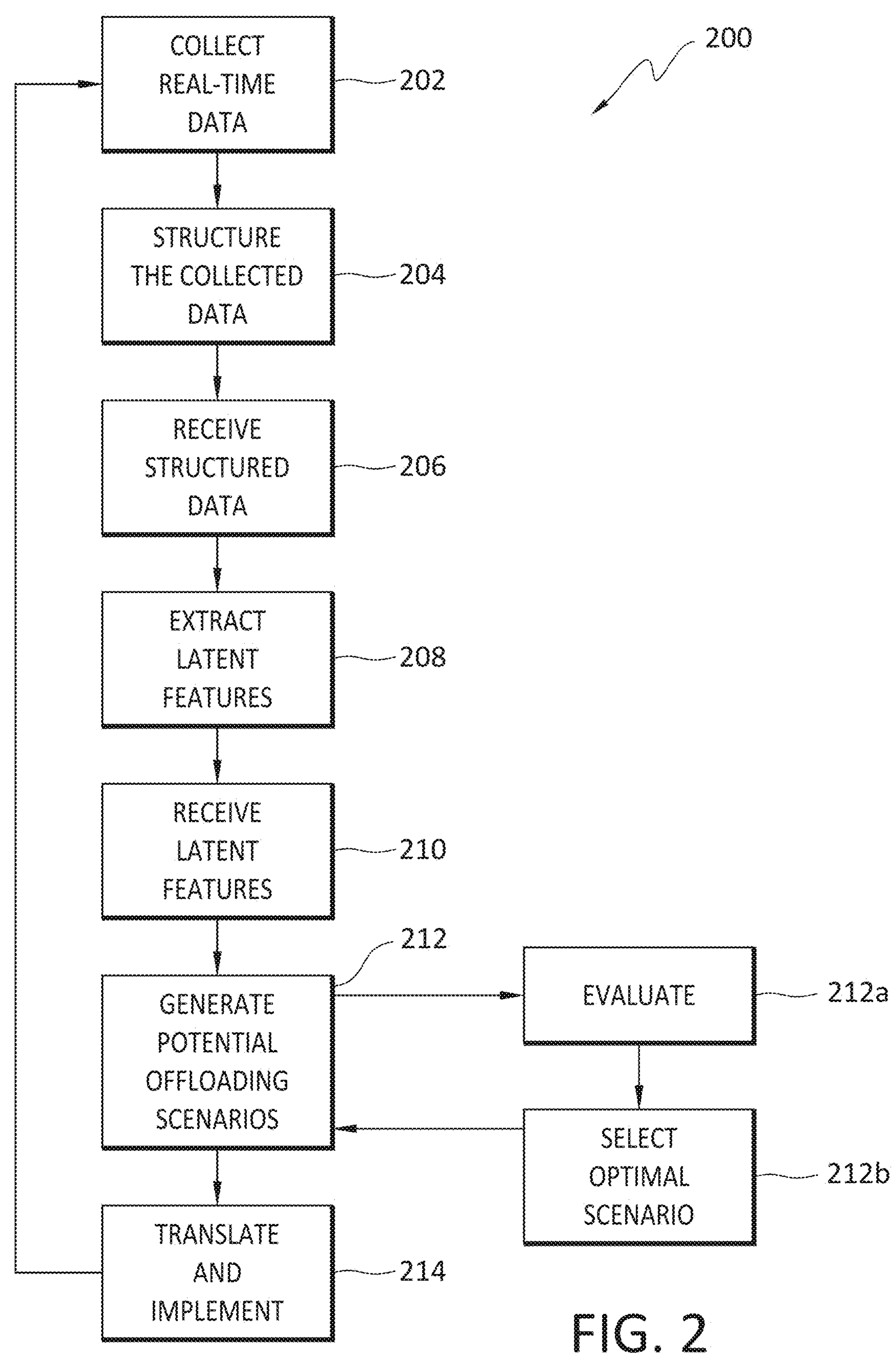
FIG. 2 discloses aspects of a method according to one embodiment.

Directing attention now to FIG. 2, a method 200 according to one embodiment is disclosed. In one embodiment, the method 200 may be performed using the example architecture 100, although that is not necessarily required. The method 200 may begin with the collection 202, in real-time, of real-time data concerning one or more aspects of network operations. The collected data may then be structured 204, such as by reducing its dimensionality for example, and passed along for further processing.

The structured data may then be received 206 for further processing. For example, one or more latent features may be extracted 208 from the structured data. The latent features may then be passed along, and received 210 for use in generating 212 potential offloading scenarios. The generation 212 of potential offloading scenarios may further involve evaluation 212*a* of the potential offloading scenarios, and selection 214 of an optimal one of the potential offloading scenarios.

The optimal offloading scenario may then be passed along, and a process 214 of translation and implementation of the optimal offloading scenario performed. That is, the optimal offloading scenario may be translated to a form understandable by the component(s) that will be perform the workload, and then implemented by those components.

E. Further Example Embodiments

Following are some further example embodiments. These are presented only by way of example and are not intended to limit the scope of this disclosure or the claims in any way.

Embodiment 1. A method, comprising: collecting real time data regarding operations in a network; processing the real time data to create structured data; extracting latent features from the structured data; using the latent features to generate potential workload offloading scenarios; identifying an optimal workload offloading scenario from the potential workload offloading scenarios; translating the optimal workload offloading scenario into a form understandable by a network device that is performing a workload; and transmitting an offloading command to the network device.

Embodiment 2. The method as recited in any preceding embodiment, wherein the real time data comprises data concerning any one or more of latency, energy consumption by the network device, availability of the network device availability to perform the workload, and a current workload of the network device.

Embodiment 3. The method as recited in any preceding embodiment, wherein processing the real time data comprises performing a dimensionality reduction process on the real time data.

Embodiment 4. The method as recited in any preceding embodiment, wherein the extracting of the latent features is performed using a latent layer model (LLaM).

Embodiment 5. The method as recited in any preceding embodiment, wherein generation of the potential workload offloading scenarios is performed by a generative AI (artificial intelligence) module that also evaluates the potential workload offloading scenarios in real-time to ensure that the potential workload offloading scenarios are feasible.

Embodiment 6. The method as recited in any preceding embodiment, wherein the optimal workload offloading scenario is deemed optimal based on then-current conditions in the network.

Embodiment 7. The method as recited in any preceding embodiment, wherein the optimal workload offloading scenario is deemed optimal based on anticipated conditions in the network.

Embodiment 8. The method as recited in any preceding embodiment, wherein the potential workload offloading scenarios are generated on an ongoing basis as data is collected, and the latent features extracted.

Embodiment 9. The method as recited in any preceding embodiment, wherein the offloading command causes the network device to offload the workload to another network device, and offloading of the workload to the another network device improves an aspect of operation of the network relative to what the aspect of operation was before the workload was offloaded to the another network device.

Embodiment 10. The method as recited in any preceding embodiment, wherein the potential workload offloading scenarios are generated based in part on either, or both of, predictions and states generated by a network digital twin, and a knowledge graph that comprises a structured representation of entities in the network, and interrelations between and among the entities.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of this disclosure also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality. Combinations of the above should also be included within the scope of computer storage media. Such media are also examples of non-transitory storage media, and non-transitory storage media also embraces cloud-based storage systems and structures, although the scope of this disclosure is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments may be downloadable to one or more systems or devices, for example, from a website, mesh topology, or other source. As well, the scope of this disclosure embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, agent, service, engine, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments may be performed in client-server environments, whether network or local environments, or in any other suitable environment. Suitable operating environments for at least some embodiments include cloud computing environments where one or more of a client, server, or other machine may reside and operate in a cloud environment.

Figure 3:
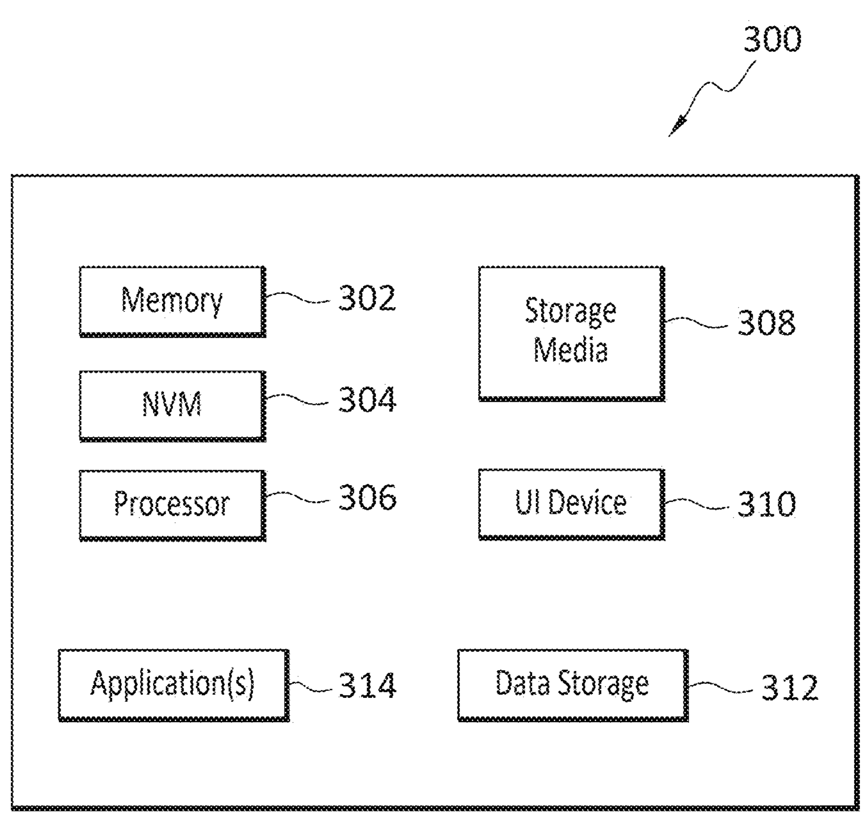
FIG. 3 discloses an example computing entity configured and operable to perform any of the disclosed methods, processes, and operations.

With reference briefly now to FIG. 3, any one or more of the entities disclosed, or implied, by FIGS. 1-2, and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The described embodiments are to be considered in all respects only as illustrative and not restrictive. All changes which come within the meaning and range of equivalency of the claims are to be embraced within their scope.

What is claimed is:

1. A method for offloading workloads, comprising:

collecting real time data regarding operations in a network;

processing the real time data to create structured data;

extracting latent features from the structured data using a latent layer model comprising a data encoder configured to transform the structured data into a lower-dimensional latent representation and a feature extractor configured to identify features indicative of network state and device capabilities;

using the latent features to generate potential workload offloading scenarios, each potential workload offloading scenario comprising at least a candidate destination device and a workload allocation mapping, wherein the potential workload offloading scenarios are generated by a generative artificial intelligence module that generates a plurality of candidate workload offloading scenarios, each representing a respective candidate workload assignment configuration based on the latent features;

identifying an optimal workload offloading scenario with respect to at least one network performance metric from the potential workload offloading scenarios, wherein identifying the optimal workload offloading scenario comprises evaluating the plurality of candidate workload assignment configurations based on the latent features;

translating the optimal workload offloading scenario into a form understandable by a network device that is performing a workload; and transmitting an offloading command to the network device.

2. The method as recited in claim 1, wherein the real time data comprises data concerning any one or more of latency, energy consumption by the network device, availability of the network device availability to perform the workload, and a current workload of the network device.

3. The method as recited in claim 1, wherein processing the real time data comprises performing a dimensionality reduction process on the real time data.

4. The method as recited in claim 1, wherein the extracting of the latent features is performed using the latent layer model, the latent layer model comprising an encoder neural network configured to transform structured data into a lower-dimensional latent representation and a feature extractor configured to identify features indicative of network state and device capabilities.

5. The method as recited in claim 1, wherein generation of the potential workload offloading scenarios is performed by a generative AI (artificial intelligence) module that also evaluates the potential workload offloading scenarios in real-time to ensure that the potential workload offloading scenarios are feasible.

6. The method as recited in claim 1, wherein the optimal workload offloading scenario is deemed optimal based on then-current conditions in the network.

7. The method as recited in claim 1, wherein the optimal workload offloading scenario is deemed optimal based on anticipated conditions in the network.

8. The method as recited in claim 1, wherein the potential workload offloading scenarios are generated on an ongoing basis as data is collected, and the latent features extracted, each scenario defining at least (i) a target device for offloading and (ii) a corresponding allocation of one or more workloads to the target device.

9. The method as recited in claim 1, wherein the offloading command causes the network device to offload the workload to another network device, and offloading of the workload to the another network device improves an aspect of operation of the network relative to what the aspect of operation was before the workload was offloaded to the another network device.

10. The method as recited in claim 1, wherein the potential workload offloading scenarios are generated based in part on either, or both of, predictions and states generated by a network digital twin, and a knowledge graph that comprises a structured representation of entities in the network, and interrelations between and among the entities.

11. A non-transitory storage medium having stored therein instructions that are executable by one or more hardware processors to perform operations comprising:

collecting real time data regarding operations in a network;

processing the real time data to create structured data;

extracting latent features from the structured data using a latent layer model comprising a data encoder configured to transform the structured data into a lower-dimensional latent representation and a feature extractor configured to identify features indicative of network state and device capabilities;

using the latent features to generate potential workload offloading scenarios, each potential workload offloading scenario comprising at least a candidate destination device and a workload allocation mapping, wherein the potential workload offloading scenarios are generated by a generative artificial intelligence module that generates a plurality of candidate workload offloading scenarios, each representing a respective candidate workload assignment configuration based on the latent features;

identifying an optimal workload offloading scenario with respect to at least one network performance metric from the potential workload offloading scenarios, wherein identifying the optimal workload offloading scenario comprises evaluating the plurality of candidate workload assignment configurations based on the latent features;

translating the optimal workload offloading scenario into a form understandable by a network device that is performing a workload; and transmitting an offloading command to the network device.

12. The non-transitory storage medium as recited in claim 11, wherein the real time data comprises data concerning any one or more of latency, energy consumption by the network device, availability of the network device availability to perform the workload, and a current workload of the network device.

13. The non-transitory storage medium as recited in claim 11, wherein processing the real time data comprises performing a dimensionality reduction process on the real time data.

14. The non-transitory storage medium as recited in claim 11, wherein the extracting of the latent features is performed using the latent layer model, the latent layer model comprising an encoder neural network configured to transform structured data into a lower-dimensional latent representation and a feature extractor configured to identify features indicative of network state and device capabilities.

15. The non-transitory storage medium as recited in claim 11, wherein generation of the potential workload offloading scenarios is performed by a generative AI (artificial intelligence) module that also evaluates the potential workload offloading scenarios in real-time to ensure that the potential workload offloading scenarios are feasible.

16. The non-transitory storage medium as recited in claim 11, wherein the optimal workload offloading scenario is deemed optimal based on then-current conditions in the network.

17. The non-transitory storage medium as recited in claim 11, wherein the optimal workload offloading scenario is deemed optimal based on anticipated conditions in the network.

18. The non-transitory storage medium as recited in claim 11, wherein the potential workload offloading scenarios are generated on an ongoing basis as data is collected, and the latent features extracted, each scenario defining at least (i) a target device for offloading and (ii) a corresponding allocation of one or more workloads to the target device.

19. The non-transitory storage medium as recited in claim 11, wherein the offloading command causes the network device to offload the workload to another network device, and offloading of the workload to the another network device improves an aspect of operation of the network relative to what the aspect of operation was before the workload was offloaded to the another network device.

20. The non-transitory storage medium as recited in claim 11, wherein the potential workload offloading scenarios are generated based in part on either, or both of, predictions and states generated by a network digital twin, and a knowledge graph that comprises a structured representation of entities in the network, and interrelations between and among the entities.

* * * * *